Figure 1:
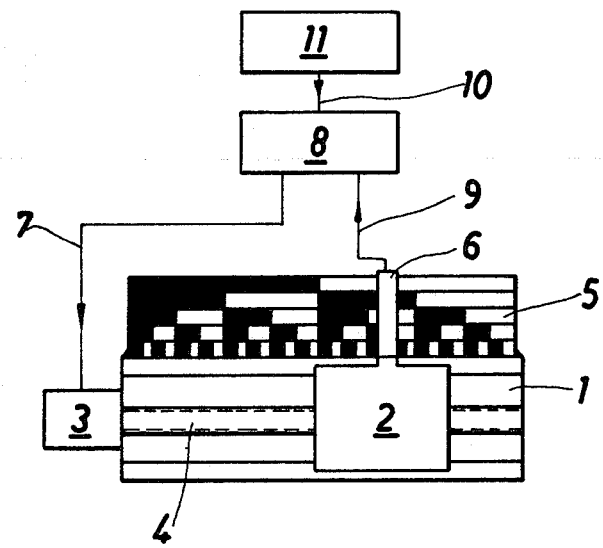

United States Patent

[11] 3,604,810

| [72] | Inventor | Kurt Schuch<br>Jena, Germany |
|---|---|---|
| [21] | Appl. No. | 747,404 |
| [22] | Filed | June 14, 1968 |
| [45] | Patented | Sept. 14, 1971 |
| [73] | Assignee | VEB Jenoptik Jena GmbH<br>Jena, Germany<br>Continuation-in-part of application Ser. No. 405,873, Oct. 22, 1964, now abandoned. |

[54] APPARATUS FOR THE OBJECTIVE LOCALIZATION OF AN OBJECT RELATIVE TO A SCALE CARRIER
1 Claim, 6 Drawing Figs.

[52] U.S. Cl. .................................................. 356/139,
250/219 D, 356/152, 356/170, 356/172
[51] Int. Cl. ....................................................... G01b 11/26
[50] Field of Search ........................................... 356/139,
170, 150, 151, 169, 152, 172; 250/219 ID, 237;
173/21; 116/124.4

[56]  References Cited
UNITED STATES PATENTS

| 3,037,420 | 6/1962 | Stade................................. | 356/169 |
|---|---|---|---|
| 3,046,541 | 7/1962 | Knox................................. | 356/160 |
| 3,451,054 | 6/1969 | Johnson ............................ | 356/169 |
| 3,453,441 | 7/1969 | Gantz et al........................ | 250/233 |
| 3,500,055 | 3/1970 | Russell et al..................... | 250/219 (ID) |

FOREIGN PATENTS

| 1,236,589 | 1960 | France ............................ | 356/167 |
|---|---|---|---|
| 1,069,384 | 1967 | Great Britain.................. | 250/219 (ID) |
| 37,951 | 1965 | East Germany.............. | 356/167 |

Primary Examiner—Ronald L. Wibert
Assistant Examiner—J. Rothenberg
Attorney—Nolte and Nolte ABSTRACT: The positioning system of a machine tool comprises a coded multitrace scale which cooperates with a scanner provided with an interpolation system subdividing the intervals of the finest code trace. The scanner is provided with an optical element having a binary-coded scale effecting cyclical motion, and with pulse transmitters starting and terminating the interpolation process. Photoelectric receivers scan the coded scale and the optical element.

APPARATUS FOR THE OBJECTIVE LOCALIZATION OF AN OBJECT RELATIVE TO A SCALE CARRIER

This application is a Continuation-in-Part of my copending application Ser. No. 405,873 filed on Oct. 22, 1964 now abandoned.

This invention refers to an apparatus for the objective localization of an object relative to the carrier of a scale with binary codification the smallest intervals of which can be divided by interpolation.

Machine tools require feed-motion meters with controllable start signals for the automatic adjustment of the tool relative to the workpiece according to numerically preselected programs. Meters of this kind comprise substantially a scale and a scanner which are displaced relatively to each other by the motion of the tested object, the scanner permitting the measurement of the magnitude of the relative displacement between object and machine tool.

Most meters of wide range and high resolving power supply the obtained values in digits. They are more reliable than analogous meters with measuring-range magnification, in which some of the resolving power is lost. In digital measuring, the change of the test magnitude to another physical magnitude is not continuous but takes place in finitely small elemental steps, the space or angle to be measured being subdivided into equal test units (path increments).

Meters with transformation of motion because of the necessary transmission elements loose some of their accuracy and are subject to wear. Preference is therefore given to meters with direct contactless pickup, which are more satisfactory also in point of measuring technique.

Meters of absolute operative characteristics have a definite datum setting to which the test values regardless of position are referred by means of a scanner and a codified scale comprising a plurality of code traces. On this scale defined binary combinations of signs are picked up which characterize definite test positions. In meters of this kind, the datum setting does not get lost even if the current supply is interrupted. However, it is technically difficult to manufacture dually codified divisions of approximately 1/100 millimeter and less and, moreover, the picking up of position values of such finely codified transverse scales impairs the measuring accuracy and may render the meter practically useless.

Incrementally working meters depend on the counting of events (impulse-increment method), that is to say on the counting of the pulses. These pulses are produced in the scanner when the specimen and the machine tool are displaced relatively to each other, that is to say when a corresponding relative motion takes place between scanner and line-marked scale. The number of the counted pulses multiplied by the magnitude of a path increment is equal to the covered distance. Finding the direction of motion requires another pickup with scale displacement and a counting-direction discriminator. In incremental meters there is no fixed relation to the original start position. Interruption of current therefore involves the loss of the datum setting, which can be reestablished, if at all, only by returning to the normal position. A further disadvantage of incremental measuring systems is the danger of interference pulses of the absorption of counting pulses.

Other meters work in two stages, the one stage being for coarse measurement along the entire range, and the other being of greater resolving power and supplying the interpolation values.

Such interpolation devices have for example line-trapping forks or optical measuring appliances the analogous motion of which provides photometric balance of symmetry and is a measure of the magnitude to be interpolated, but the transformation of the analogous magnitude into digits requires a respective translating device.

Reading the code traces of the absolute meter presents certain known difficulties when there is a change from "0" to "1" in several traces at the same place. Experience has proved how very difficult it is at such a transition place always to switch the scanners (the reading elements) at exactly the same time, nonsimultaneous change of but one trace resulting in wrong positional values. To avoid faulty readings from interval to interval at the transition places of the code division, use is made of scanner of V or U shape. Such double reading is by means of two scanners per trace, the one leading a definite distance in front of the measuring point and the other lagging by the same distance behind that point, so that ambiguities in reading and, accordingly, in the indication of the positional setting are avoided. In the U-shaped scanner arrangement the scanners coordinated to the several code traces are all the same distance apart. The V-shaped scanner arrangement offers the advantage that to the code trace of the smallest intervals only one scanner need be coordinated, while each of the other traces requires a pair of scanners. The scanners of these pairs have a distance apart which is equal to half the length of one field of the respective code trace. Regarding the foregoing measuring systems and devices, reference is made to the book of W. Simon "Die numerische Steuerung von Werkzeugmaschinen," Carl Hauser Verlag, Munchen 1963, particularly pages 36 to 39, 77, 113 et seq.

The present invention aims at overcoming the foregoing disadvantages in apparatus for the objective localization of an object relative to a scale carrier.

To this end the invention consists in an apparatus for measuring lengths or angles which combines the advantages but is without the shortcomings of known incremental and absolute working meters and which is very safe in measuring paths of motion on an absolute basis in consideration of even smallest path elements. The interpolator of the apparatus according to the invention is provided with known means for imaging the finest division of the scale carrier on an optical element which is in continuous motion during the measuring process and bears a binary scale and two marks, these marks respectively initiating and stopping the continuously repeated interpolation process. The magnification ratio in the imaging of the finest division can be any desired ratio. The expressions "binary" and "dual" as employed in this specification has the same meaning.

When using this interpolator, there is neither an interruption in the periodical sequence of the formation of interpolation values nor a reversal in the counting direction when the scanner-head and the scale carrier are displaced relatively to each other over several division intervals.

Whereas the interpolator digitally and without special transformation receives the intermediate values from a binary-divided scale in continuously repeated measurement, the determination of the full intervals takes place according to a known measuring method by picking up binary combinations of signs resulting from the position of the dually coded scale. The result of the interpolation value of the interpolator, which stands for a short time only, causes the scanning elements to be switched for a leading or lagging scan of the code trace having the smallest intervals of $2^{n+1}$ times the test unit. Switching the scanning elements of the code traces of higher values is effected in the known manner according to the result obtained from the preceding trace.

The division constant of the division to be interpolated follows from any selected $2^n$ fold value of the smallest test unit. For example, if that unit is $1\mu m$ and the division constant of the dually coded scale is $2^{10}=1024\mu m$, the optical element in the ray-path imaging the division lines on the photoelectric receiver is to have $2^n=2^{10}$ division intervals. The counting result of the interpolator is accordingly of the same dual form and the same value as would be supplied in the respective $2^n$ trace by, for example, an absolute working meter dually codified from the smallest test unit onward. The counting pulses of the interpolator and the graduation, which is to be interpolated, of the dually coded scale are in definite relation to each other because the number of intervals of the optical element is $2^n$ and because the interval length of the code trace, which is to be interpolated, of the dually coded scale is equal to the product of the number of intervals and the length of the smallest test unit. The test unit depends on the desired measuring accuracy.

Advantageously, the optical element in the ray-path is in the form of a disc.

Figure 3:
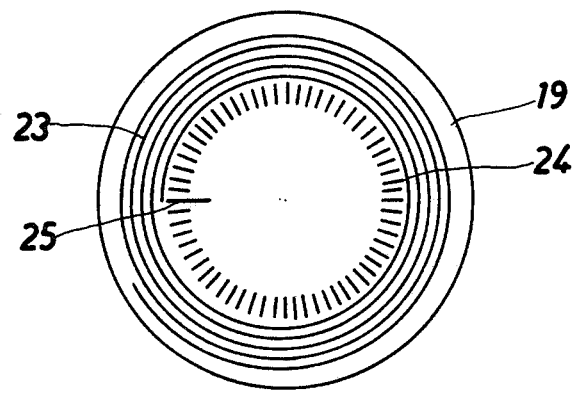
Figure 2:
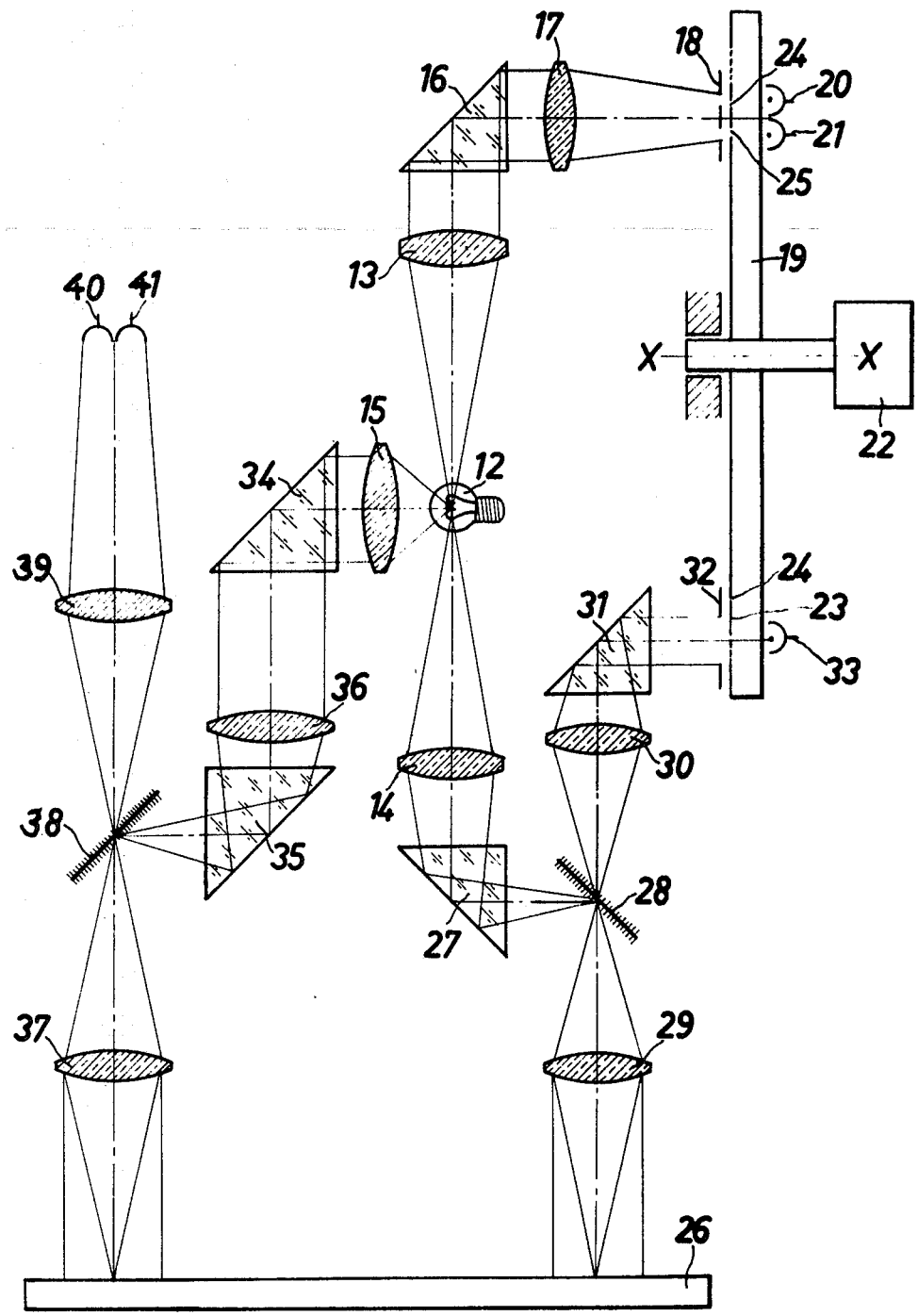
Figure 4:
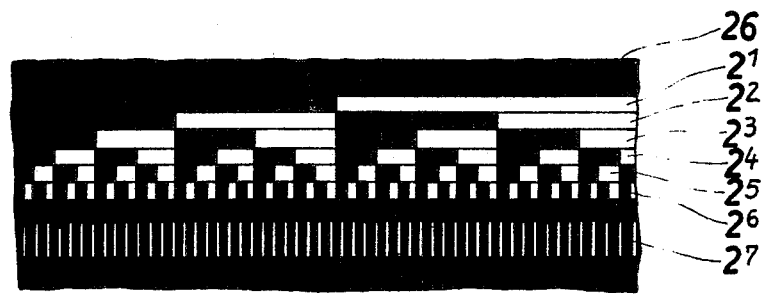
Figure 5:
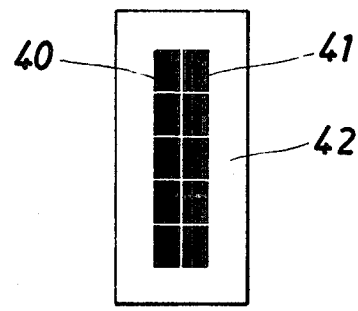
Figure 6:
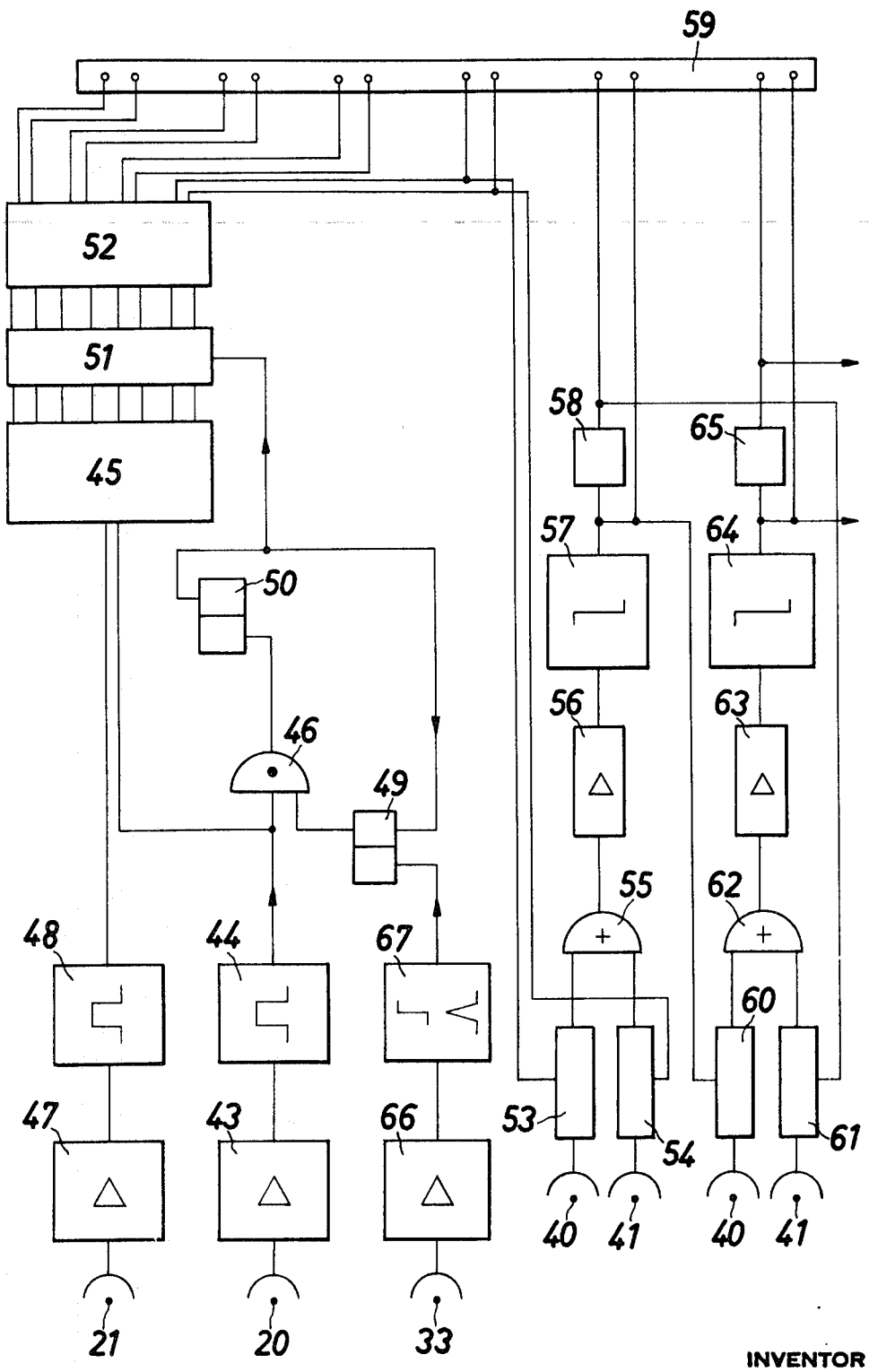

In order that the invention may be more readily understood, reference is made to the accompanying drawings which illustrate diagrammatically and by way of example one embodiment of the apparatus according to the invention and in which FIG. 1 shows the coordination of the apparatus of the invention to a machine tool, FIG. 2 shows the entire optical system of this apparatus, FIG. 3 shows the optical element bearing the interpolation scale, FIG. 4 shows part of the scale carrier, FIG. 5 shows the arrangement of the cells of a scanning element, and FIG. 6 is a diagram of the electric connections.

In FIG. 1 a slide 2 mounted on a machine-tool base 1 is displaceable by means of a spindle 4 operated by a motor 3. A coded scale 5 comprising five code traces is fast with the base 1, and a scanner 6 coordinated to the scale 5 is fast with the slide 2. The scanner 6 will be described in more detail with reference to FIG. 5. An electric wire 7 connects the motor 3 with a comparator 8, which in its turn is connected by an electric wire 9 with the scanner 6. An electric wire 10 connects an information device 11 with the comparator 8.

The information device 11, for example a punched-tape reader, emits signals through the comparator 8 to the motor 3, which drives the spindle 4 and, accordingly, displaces the slide 2. The slide 2 makes the scanner 6 travel along the scale 5 and causes electric signals to be produced in the scanner 6. The wire 9 transmits these signals to the comparator 8, which compares them with the signals arriving from the information device 11. If the compared signals are equal to each other, the operation of the motor 3 is interrupted, because the slide 2 has assumed the position selected for it by the information device 11. The above-described positioning process can be repeated as often as desired, depending on the amount of information stored in the information device 11.

In FIG. 2, a light source 12 is disposed at the common focus of condensers 13, 14 and 15 of three illumination systems. The illumination ray-paths of these systems are described hereinafter. The one illumination system contains, in addition to the condenser 13, a right-angled prism 16 the hypotenuse face of which deflects a light beam by 90°, and a convergent lens 17. In the ray-path of this one illumination system is moreover a double-slit diaphragm 18 cutting down disturbing extraneous light, an opaque disc 19 and photoelectric receivers 20 and 21 coordinated respectively to each of the two slits of the diaphragm 18. An electric motor 22 rotates the disc 19 about an axis X-X approximately parallel to the optical axis of the convergent lens 17. The disc 19 has on its margin a transparent spiral 23, a division 24 (interpolation division) and a single line 25. The number of lines of the division 24 is $2^n$ times the smallest test unit of the chosen scale. The division 24 and the single line 25 are so located on the disc 19 that a rotation of this disc causes them to pass through the space between the double-slit diaphragm 18 and the photoelectric receivers 20, 21. Instead of a single line 25 separate from the division 24, it is possible to use a line in corresponding elongation of one of the lines of this division (FIG. 3).

The other illumination system illuminates a scale carrier 26 and in addition to the condenser 14 has a right-angled deviating prism 27, a semisilvered mirror 28 and a convergent lens 29. The convergent lens 29, a convergent lens 30 and a right-angled prism 31 image the respective scale section in the plane of the transparent spiral 23 on the rotating opaque disc 19. In close vicinity to the one side of the disc 19 is an image-limiting diaphragm 32, and in close vicinity to the other side of the disc 19 is a photoelectric receiver 33.

The third illumination system in addition to the condenser 15 has two right-angled prisms 34 and 35 which displace the ray beam parallel to itself, two convergent lenses 36 and 37 and a semisilvered mirror 38, which image the light-source 12 at infinity and illuminate the scale carrier 26. The illuminated part of the scale 26 is imaged via the convergent lens 37 and a convergent lens 39 on two photoelectric receivers 40 and 41.

The carrier 26 has a scale which is similar to the scale 5 of FIG. 1. The code traces $2^0$ to $2^7$ of the scale carrier 26 (FIG. 4) moved in the measuring process, which are illuminated by the third illumination system, are picked up via the two convergent lenses 37 and 39 and the semisilvered mirror 38 between these lenses by the photoelectric receivers 40 and 41 juxtaposed to each other, the scale carrier 26 being thus scanned. In the receivers 40 and 41 electric pulses are produced. The location of the photoelectric receivers 40 and 41 on a carrier 42 is shown in FIG. 5. To the avoidance of ambiguities due to too fast or too slow scanning, two silicium photoelements juxtaposed to each other are coordinated to each code trace. Changing to too fast or too slow scanning of the first code trace of the scale, which has a division constant $2^{n+1}$ times the unit length, is effected according to the respective result of the interpolation of the momentary measuring period.

The said one illumination system by way of the double-slit diaphragm 18 illuminates those parts of the opaque disc 19 rotating in the measuring process about the axis X-X which carry the transparent scale 24 and the transparent single line 25, the photoelectric receivers 20 and 21 thus receiving at one disc rotation a maximum of $2^n$ pulses and one pulse, respectively. The light pulses striking the photoelectric receiver 20 produce electric pulses, which in a manner described hereinafter are directed to an electronic counter consisting of bistable multivibrators. The beam striking the photoelectric receiver 21 produces an electric pulse for resetting the electronic counter to zero and the start of a new interpolation process. Owing to the continuous rotation of the disc 19 and the interpolation process is repeated continuously. The single line 25 starts the interpolation process, and the spiral 23 terminates it.

The said other illumination system is for the illumination of the part of the disc 19 which is provided with the transparent spiral 23. In the aperture of the image-limiting diaphragm 32, in consequence of the rotation of the disc 19, the transparent spiral windings next to each other are displaced in the manner of transversely moving grating lines at so high a velocity relative to the brightly imaged scale lines that even if these lines during the object displacement move in the same sense the position of the spiral 23 and that of the scale lines will coincide in every measuring period. This coincidence is distinguished by a maximum of intensity because the light reflected by the scale lines can fully penetrate the transparent spiral. The photoelectric receiver 33, for example a photodiode, supplies photocurrent equivalent to the intensity of light. The photocurrent pulse is so treated by means of known electronic pulse-forming methods that its extreme magnitude releases a very pronounced voltage pulse, namely the coincidence signal.

If the result of the interpolation values of the $2^n$ (i.e. $2^6$) code trace is "1, the scanning of the trace $2^{n+1}$ (i.e. $2^7$) is switched to "lag," and if the result of those values of the $2^n$ trace is "0" the trace $2^{n+1}$ is switched to "lead." "1" and "0" stand for the two basic numerals of the dual or binary system which are used in electrical logics. The scanning of the $2^{n+1}$ trace and the traces of higher value is effected in known manner according to the result of the trace one value lower. The storage pulse is produced by the electronic system to be described in the following paragraphs, and is derived from the coincidence signal. The storage pulse in turn starts the scanning of the code traces with a time delay. The sequence of the scanning of the code traces is controlled by an electronic pulse timer.

Instead of the glass disc 19, it is possible to use as optical element a rectangular glass plate, which bears the interpolation scale 24, a single line 25 and, in place of the spiral 23, a grid or other linear marks, the single line 25 initiating and the grid or linear marks terminating the interpolation, and the glass plate oscillating parallel to the interpolation scale.

The manner in which the light signals supplied by the optical part of the interpolation system are transformed into electric pulses is described with reference to FIG. 6. The electric pulses produced in the photoelectric receiver 20 proceed through an amplifier 43 and then a pulse-shaping Schmitt trigger 44. They are transmitted direct to an electronic dual meter 45 and arrive on the other hand at a gate switch 46. In the electronic dual meter 45, consisting of bistable multivibrators, the counting pulses are continuously counted until the start pulse enters, the start pulse being obtained in the same manner as the counting pulses by way of an amplifier 47 and a Schmitt trigger 48. The start pulse sets the dual meter 45 at "-zero" and thus begins another counting process. The coincidence pulse obtained in the electric receiver 33 proceed via an amplifier 66 and a Schmitt trigger 67 to a bistable multivibrator 49 which together with a monostable multivibrator 50 prevents wrong counting by blocking any storage as long as the dual meter 45 is still traversed by a counting pulse given before the coincidence pulse. The storage pulse thus obtained causes storage gates 51 to open and the instantaneous counting result to be transmitted to a storage device 52. At the same time, the storage pulse over the bistable multivibrator 49 cuts off the gate switch 46, so that the counting pulses following can no longer release any further storage pulses. The code traces of the scale are scanned according to known methods of the U-principle, the photoelectric receivers 40 and 41 being arranged U-wise on the carrier 42 (FIG. 5). Regarding the first scale code trace of $2^{n+1}$ value, the scanning by the photoelectric receivers 40 and 41 is controlled by way of gate switches 53 and 54, which are switched to lead or lag photoelectric scanning according to the interpolation value happening to be in the storage device 52.

An or-element 55 prevents the pulse passing through a gate switch from exerting any feedback influence on the other gate switch and compels it to proceed to an amplifier 56. In a Schmitt trigger 57 the amplified pulse is slightly amplified again and divided, and in a negator 58 the potential is reversed. Accordingly a panel 59 receives pulses for data evaluation which are exactly defined and all of the same voltage.

The second code traces, which are of higher value, are scanned in the same manner. Respective gate switches 60 and 61 are controlled according to the result of the preceding trace. Also in this case, the pulse proceeding from one of the gate switches passes through an electric or-element 62, an amplifier 63, a Schmitt trigger 64 and a negator 65 and arrives as an exact pulse of the same voltage as the preceding ones at the panel 59 for further data evaluation.

The invention is not restricted to the above-described embodiment but can be varied in many ways. For example it is possible without any loss of accuracy or safety so to construct the apparatus according to the invention that the interpolation system with the binary-divided scale is separate from the scale with the second code trace of higher value and the thereto coordinated photoelectric receivers. It is also possible to give the fine system a location separate from that of the coarse system.

As division inaccuracies and displacements of the scanning elements up to half the smallest division unit do not, theoretically, cause any reading error, the dually coded scale can be replaced by one or more dually coded discs fixed for example to a spindle. Looseness in the gears will not take effect up to the magnitude of half a division unit of the first codified trace. Unambiguousness of the measuring results is also obtainable for example by the use of a plurality of code discs of different rotation velocities.

I claim:

1. An apparatus for the objective localization of an object relative to a scale carrier, comprising at least one light source for emitting three beams of light, a carrier carrying a binary coded scale and displaceable parallel thereto, an optical element provided with a binary interpolation scale and two cyclically displaceable marks, optical means for directing the beams of light from said light source to said carrier and said optical element and for illuminating at least portions of said scales and marks, one of said beams of light illuminating said carrier, a first optical system and an assembly of photoelectric receivers, said first optical system imaging on said assembly at least a first line of said binary coded scale, another of said beams of light illuminating said interpolation scale and one of said marks and two photoelectric receivers, one of said two photoelectric receivers being in the rear of said interpolation scale and the other of said photoelectric receivers being in the rear of said one mark, the third of said beams illuminating said carrier, a second optical system, the second of said marks and a photoelectric receiver in the rear of said second mark, said second optical system imaging at least one second line of said binary coded scale on said second mark, said optical element being adjacent to the photoelectric receivers coordinated to said interpolation scale and said marks and being displaceable substantially at right angles to said another light beam and said third light beam, the one of said marks starting the process of subdividing the binary coded scale and the other of said marks terminating this process, at least one electronic counter means, the photoelectric receivers adjacent to said interpolation scale and said marks being connected to said counter means, said counter means counting the pulses emitted by the last-mentioned photoelectric receiver, a storage device connected to said counter means and to said assembly of receivers, and means for recording the countings.